Sept. 9, 1941.    J. E. SASS    2,255,630
MICROSCOPE
Filed June 18, 1940
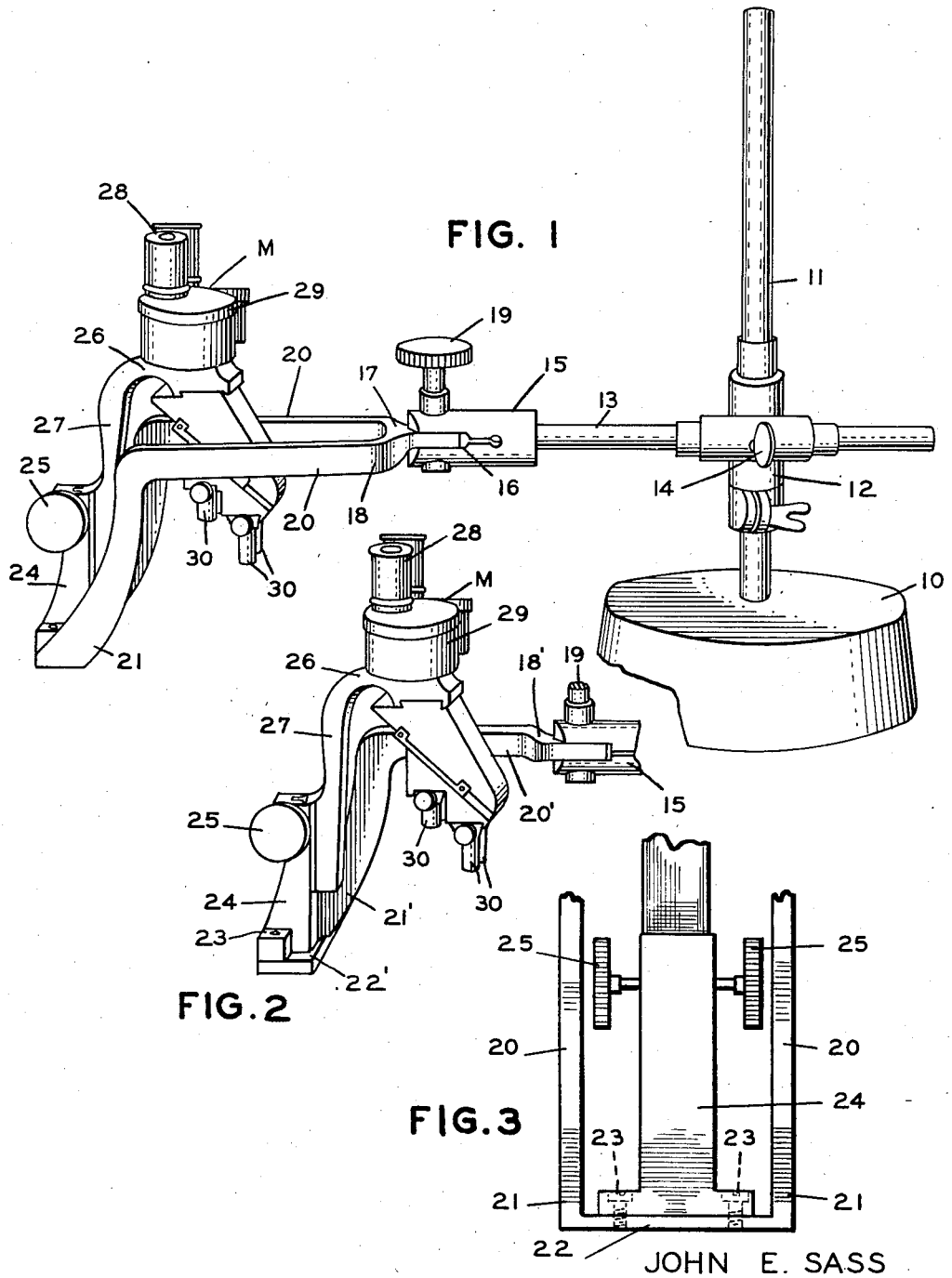
JOHN E. SASS
INVENTOR
BY *[signature]*
ATTORNEY Patented Sept. 9, 1941

2,255,630

UNITED STATES PATENT OFFICE 2,255,630

MICROSCOPE

John E. Sass, Ames, Iowa, assignor to Iowa State College Research Foundation, Ames, Iowa, a a corporation of Iowa Application June 18, 1940, Serial No. 341,163

4 Claims. (Cl. 88—39)

This invention relates to microscopes and more particularly it has reference to supporting devices or stands which are used for suspending microscopes, such as those of the Greenough binocular type, over objects having a relatively large area such as herbarium sheets and the like.

Under the practice of the prior art, a binocular microscope of this type is mounted on the end of a horizontal rod which is carried by a support such as a laboratory ring stand or table clamp. With such an arrangement, the microscope is supported above the table top and adapted to be moved around in a horizontal plane so as to locate it above a desired portion of a large specimen or object. In such structures, however, the control knobs, which are used for actuating the focusing mechanism of the microscope, are located adjacent the end of the horizontal rod and positioned between the oculars of the microscope and the end of the horizontal supporting rod. Such a location of the focusing knobs is very inconvenient for the operator and the operator's arm also casts a shadow over the specimen.

One of the objects of my invention is to provide an improved microscope having supporting means permitting it to be adjustably mounted over a large specimen while still affording convenient and efficient manipulation of the instrument. Another object is to provide an instrument of the type described which will have its focusing knobs located close to the operator so as to afford convenient manipulation and eliminate the possibility of the operator's arm casting undesirable shadows on the specimen. A further object is to provide a microscope having a horizontal support carrying a bracket for suspending the microscope over a specimen in such a position that the focusing knobs of the microscope will be positioned adjacent the operator.

These and other objects and advantages reside in certain novel features of construction, arrangement and combination of parts as will hereinafter be more fully described and pointed out in the appended claims.

Referring to the drawing:

Fig. 1 is a perspective view showing a microscope embodying my invention.

Fig. 2 is a fragmentary perspective view of a modification.

Fig. 3 is an enlarged fragmentary view showing the end of the supporting bracket.

A preferred embodiment of my invention is shown in Fig. 1 wherein 10 indicates a heavy metal base carrying a vertical rod 11 on which is adjustably and slidably mounted the clamp 12 which in turn carries the slidably mounted horizontal rod 13 adapted to be held in adjusted position by set screw 14. The free end of rod 13 carries an enlarged boss 15 having a slot 16 in which the head 17 of bracket 18 is adjustably held by means of the set screw 19.

The bracket 18 has two spaced arms 20 which extend horizontally and then downwardly. The ends 21 of the arms 20 are connected by a plate 22 which may be formed integral with the arms or made separately and attached thereto with screws. Attached to the plate 22 by screws 23 is the block member 24 which carries the usual rack and pinion, not shown, adapted to be actuated by knobs 25 for focusing the optical system M carried on the horizontal portion 26 of the arm 27 which is slidably mounted on member 24.

The optical system M comprises a pair of oculars 28, mounted on prism boxes 29, and cooperating pairs of objectives 30 to form a binocular microscope of the well known Greenough type. Although I have shown a microscope system of the Greenough type, it is obvious that other types of microscopes could be mounted on the bracket 18 for efficient and convenient operation.

In the modification shown in Fig. 2, the bracket 18' has only one horizontally extending arm 20' having the downwardly extending end 21' carrying a plate 22' on which the block member 24 is mounted. The optical system M is carried on the arm 27 which is slidably mounted on the block member 24.

In use, the base 10 rests on a table and the device is adjusted by means of clamp 12 and screws 14 and 19 until the microscope M is suspended over a specimen on the table. The operator may then use the microscope M in the usual manner and can conveniently focus the instrument by the adjusting knobs 25 without having to extend his arm over and above the specimen in order to reach the focusing knobs. Undesired shadows of the arm are therefore not cast upon the specimen under observation, as was the case with instruments of the prior art. The two arms 20 of bracket 18 provide a relatively rigid support for the microscope M which has its objectives positioned therebetween. The length and spacing of the arms 20 should be such as to accommodate various types of objective changers. In the modification of Fig. 2 the bracket 18' has only one arm 20' and hence it should be made heavier so as to afford more rigidity.

Microscopes of the binocular Greenough type are generally adapted to be interchanged on various types of bases and stands so that they may be operated in the same manner as a conventional microscope with the adjusting knobs and stand adjacent the operator and with the specimen on a stage carried by the stand. Such microscopes provide images which are neither inverted nor reverted. However, when such a microscope of the prior art is mounted on the end of a horizontal rod so as to be suspended over a large specimen, the adjusting knobs are remote from the operator and the images afforded will not be correct unless, when changing to such a type of mounting, the prism boxes are interchanged. This is an operation which cannot always be performed by the user of the microscope. With my new type of mounting, however, this disadvantage is eliminated because the microscope on my mounting is in normal operating position and interchange of prism boxes is not necessary.

From the foregoing, it will be apparent that I am able to attain the objects of my invention and provide an improved microscope having supporting means for suspending the optical system above a large specimen while still affording normal and efficient operation. The horizontal rod 13 may, of course, be carried by any suitable support such as a table edge clamp, or a plate fastened to a table top or the like. Different types of microscopes can be easily and quickly attached or removed from the bracket by the screws 22. The microscope is located in normal operating position so that the prism boxes do not have to be interchanged when attaching a microscope to my improved type of mounting. Various modifications can obviously be made without departing from the spirit of my invention.

I claim:

1. A microscope comprising supporting means, a bracket extending horizontally from said supporting means and terminating in a free end, a member secured to and extending laterally from the free end of said bracket, an arm slidably mounted on said member and having a portion substantially parallel to said bracket and extending toward a vertical plane passing through the supporting means, an optical system carried by said portion and having its optical axis lying in a plane which is perpendicular to said portion, said system comprising ocular means and objective lens means, and means on said member for adjusting said arm to focus said optical system.

2. A microscope of the character described comprising supporting means, a bracket carried by said means, said bracket comprising a pair of spaced, horizontal arms extending outwardly from said supporting means, an optical system movably mounted between said arms and carried thereby, and focusing means carried by said arms and positioned adjacent the ends of said arms for moving said optical system, said optical system being located between said focusing means and said supporting means.

3. A microscope comprising supporting means, a horizontally disposed member carried by said means, a bracket secured to said member, said bracket comprising a pair of spaced arms extending horizontally from said member, and a microscope optical system slidably mounted between said arms and carried thereby, and actuating means carried by said arms for moving said optical system for focusing purposes, said optical system being located between a vertical plane passing through said actuating means and a vertical plane passing through the union of said bracket and member.

4. A microscope comprising supporting means, a rod extending horizontally from said supporting means, a bracket carried by the free end of said rod, said bracket having a pair of paced, horizontal arms terminating in downward extensions, a member mounted between said extensions, an arm slidably mounted on said member and having a portion extending above the space between said arms, an optical system mounted on said portion and extending downwardly between said arms, and actuating means on said member for moving said slidable arm to focus the optical system.

JOHN E. SASS.